United States Patent [19]
Greenspan

[11] Patent Number: 6,026,189
[45] Date of Patent: Feb. 15, 2000

[54] METHOD OF RECOGNIZING OBJECTS WITHIN TWO-DIMENSIONAL AND THREE-DIMENSIONAL IMAGES

[75] Inventor: Michael Greenspan, Ottawa, Canada

[73] Assignee: National Research Council of Canada, Ottawa, Canada

[21] Appl. No.: 08/969,778

[22] Filed: Nov. 13, 1997

[51] Int. Cl.$^7$ ............................................. G06K 9/62
[52] U.S. Cl. ................................. 382/226; 382/286
[58] Field of Search ..................................... 382/226, 154, 382/227, 286, 289, 291

[56] References Cited

U.S. PATENT DOCUMENTS

| | | | |
|---|---|---|---|
| 4,944,023 | 7/1990 | Imao et al. | 382/37 |
| 5,058,186 | 10/1991 | Miyaoka et al. | 382/56 |
| 5,274,805 | 12/1993 | Ferguson et al. | 395/600 |
| 5,619,632 | 4/1997 | Lamping et al. | 395/141 |
| 5,710,916 | 1/1998 | Barbará et al. | 395/609 |

*Primary Examiner*—Andrew W. Johns
*Attorney, Agent, or Firm*—Neil Teitelbaum & Associates

[57] ABSTRACT

A new method is presented for efficient and reliable object recognition within noisy, cluttered, and occluded range images. An image is captured and quantized into cells having characteristics. A tree data structure is provided wherein each node of the tree is associated with a cell. The tree is traversed according to the characteristics of each associated cell using a best-first algorithm. When a leaf node is reached, potential object poses, types and locations associated with the leaf node are stored. Once sufficient information is stored, each potential recognized object is verified using a more reliable algorithm.

20 Claims, 15 Drawing Sheets

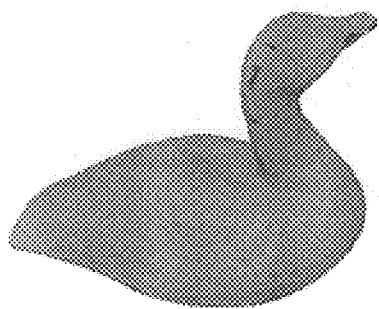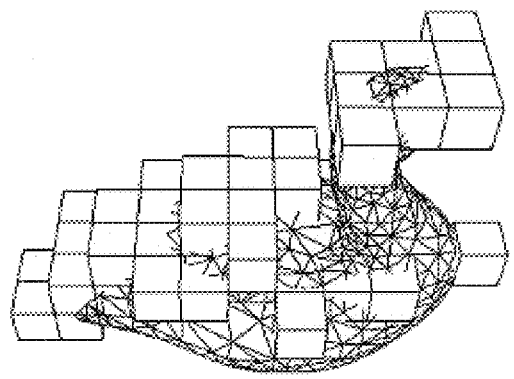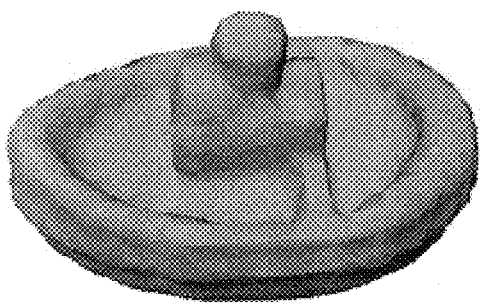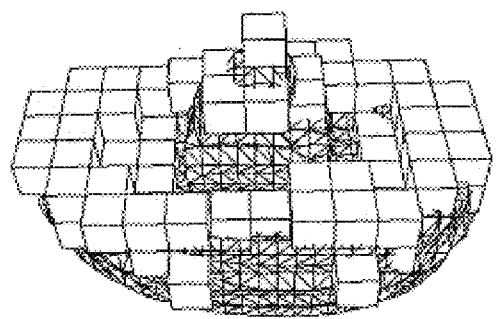
Fig. 1 sensor view rotated view solution, r=.805 image voxel map sensor view solution, r=.725 rotated view sensor view solution, r=.738 rotated view

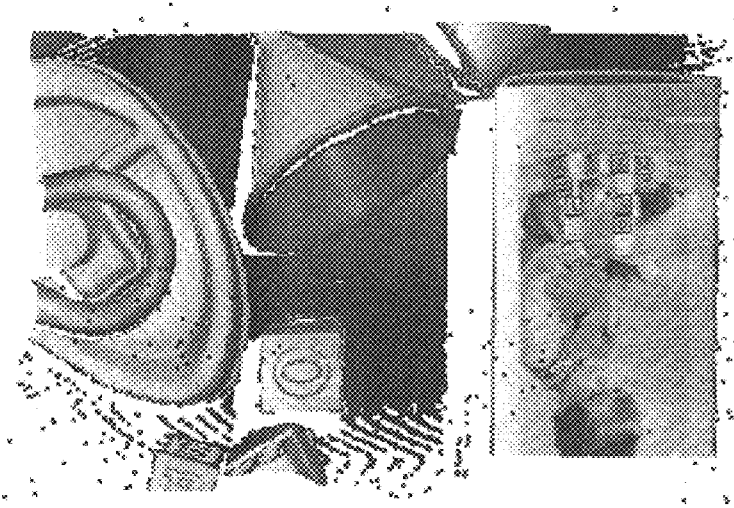
sensor view    Fig. 10a
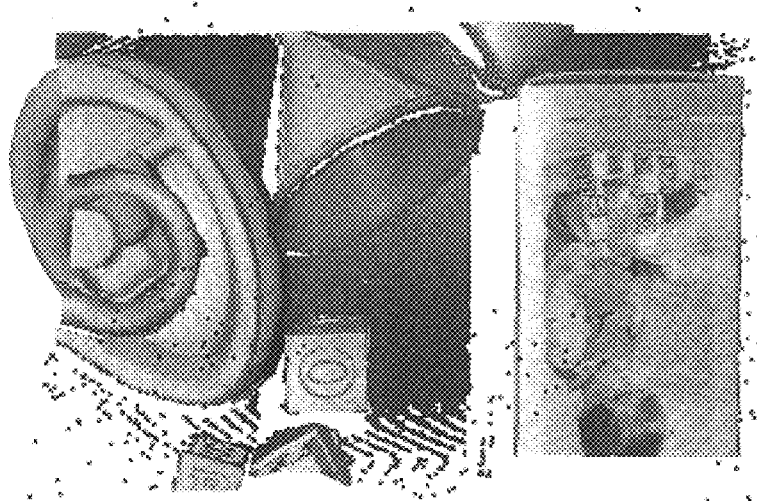
solution, r=.674    Fig. 10b
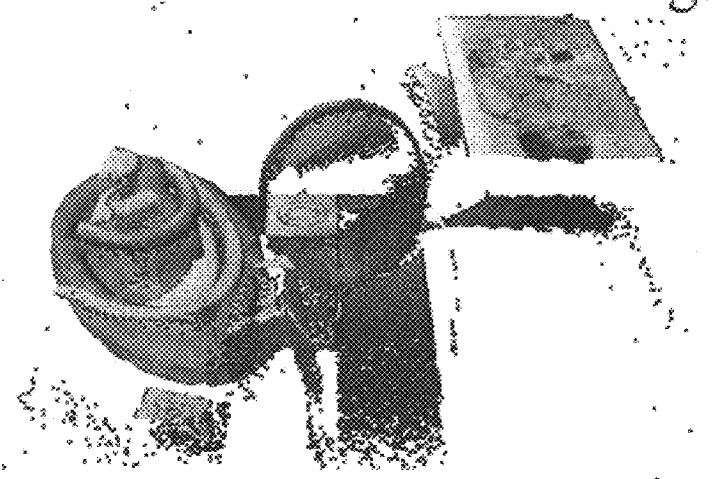
rotated view    Fig. 10c sensor view solution, r=.696 rotated view

| P(true\|sensed) | Error Event | Fidelity |
|---|---|---|
| P(F\|S) | $(E_n \wedge \bar{E}_o) \vee (\bar{E}_n \wedge E_o)$ | $e_n(1-e_o) + (1-e_n)e_o$ |
| P(O\|S) | $(E_n \wedge \bar{E}_o) \vee (\bar{E}_n \wedge E_o)$ | $e_n(1-e_o) + (1-e_n)e_o$ |
| P(U\|S) | $\phi$ | 0 |
| P(S\|S) | $\bar{E}_n \wedge \bar{E}_o$ | $1 - P(F\|S) - P(O\|S) - P(U\|S)$ $= 1 - 2(e_n(1-e_o) + (1-e_n)e_o)$ |
| P(F\|O) | $(E_n \wedge \bar{E}_o) \vee (\bar{E}_n \wedge E_o)$ | $e_n(1-e_o) + (1-e_n)e_o$ |
| P(S\|O) | $(E_n \wedge \bar{E}_o) \vee (\bar{E}_n \wedge E_o)$ | $e_n(1-e_o) + (1-e_n)e_o$ |
| P(U\|O) | $\phi$ | 0 |
| P(O\|O) | $\bar{E}_n \wedge \bar{E}_o$ | $1 - P(F\|O) - P(S\|O) - P(U\|O)$ $= 1 - 2(e_n(1-e_o) + (1-e_n)e_o)$ |
| P(S\|F) | $(E_n \wedge \bar{E}_o)$ | $e_n(1-e_o)$ |
| P(O\|F) | $(E_n \wedge \bar{E}_o)$ | $e_n(1-e_o)$ |
| P(U\|F) | $\phi$ | 0 |
| P(F\|F) | $\bar{E}_n \wedge \bar{E}_o$ | $1 - P(O\|F) - P(S\|F) - P(U\|F)$ $= 1 - 2(e_n(1-e_o))$ |
| P(F\|U) | $\phi$ | 0 |
| P(S\|U) | $\phi$ | 0 |
| P(O\|U) | $\phi$ | 0 |
| P(U\|U) | T | 1 |

Fig. 12a

| Model | | Pose Space | | Templates | | Tree | | | | | |
|---|---|---|---|---|---|---|---|---|---|---|---|
| | | | | | | Number of Nodes | | | Depth | | |
| Type | Diameter | dX | dΘ | Number | Ave. Size | Parent | Leaf | Total | Min | Max | Ave |
| Duck | .142m | .015m | 6° | 2544 | 42.5 | 2430 | 2431 | 4861 | 2 | 39 | 21 |
| Boat | .181m | .015m | 4.7° | 6904 | 91.1 | 2114 | 2115 | 4229 | 2 | 85 | 38 |

Fig. 12b

| | | | Phase 1 | | | | | Phase 2 | | | | | |
|---|---|---|---|---|---|---|---|---|---|---|---|---|---|
| | | | | | | t(msec) | | | | t(msec) | | | |
| | Seeds | h | q-ops | s-ops | $f_\pi$ | /seed | /trial | q-ops | r | /seed | /trial | Ê | R̂ |
| Min | 49 | 1 | 5 | 0 | .96 | 0.13 | 9.8 | 40 | .02 | 0.03 | 68.1 | 879 | |
| Max | 73 | | 34 | 1 | .96 | 49.63 | 63.2 | 46 | .95 | 52.93 | 179.7 | 18012 | .74 |
| Ave | 60 | | 8.5 | 0.27 | .96 | 0.23 | 13.6 | 42 | .20 | 1.88 | 113.3 | 2127 | |
| Min | 49 | 10 | 16 | 0 | .61 | 0.40 | 51.4 | 40 | .02 | 1.56 | 759.7 | 132 | |
| Max | 73 | | 99 | 39 | .96 | 10.31 | 87.2 | 46 | .95 | 81.89 | 1188.91 | 1029 | .95 |
| Ave | 60 | | 38.4 | 2.8 | .83 | 1.14 | 68.5 | 42 | .16 | 15.96 | 962.6 | 252 | |

Recognition

Fig. 12c

| Model | h | Clear | Cluttered | Occluded |
|---|---|---|---|---|
| Duck | 5 | 4 | 5 | 4 |
| | 10 | 4 | 6 | 5 |
| | 15 | 4 | 7 | 6 |
| | Total | 4 | 8 | 10 |
| Boat | 5 | 2 | 3 | 4 |
| | 10 | 2 | 3 | 4 |
| | 15 | 2 | 3 | 5 |
| | Total | 2 | 3 | 7 |

Fig. 12d

| Object | Images | h | Phase 1 | | | | Recognition Phase 2 | | | | | |
|---|---|---|---|---|---|---|---|---|---|---|---|---|
| | | | q-ops | s-ops | Sols | t(msec)/Image | q-ops | Sols | t(msec)/image | $r_{max}$ | $\hat{E}$ | $\hat{R}$ |
| Duck | 22 | 5 | 22640 | 2.16 | 3174 | 1681 | 133356 | 3.7 | 4129 | .72 | 477 | .59 |
| | | 10 | 33554 | 2.99 | 5582 | 2129 | 222500 | 7.6 | 7377 | .73 | 266 | .68 |
| | | 15 | 42540 | 3.94 | 7623 | 2677 | 335275 | 8.9 | 10159 | .73 | 189 | .77 |
| Boat | 12 | 5 | 11505 | 1.13 | 1189 | 1398 | 108371 | 7.3 | 1873 | .72 | 2954 | .75 |
| | | 10 | 15169 | 1.92 | 2228 | 1584 | 203057 | 12.1 | 3659 | .73 | 1616 | .75 |
| | | 15 | 16951 | 2.75 | 3263 | 1646 | 297208 | 13.1 | 5383 | .74 | 1114 | .83 |

Fig. 12e

METHOD OF RECOGNIZING OBJECTS WITHIN TWO-DIMENSIONAL AND THREE-DIMENSIONAL IMAGES

FIELD OF THE INVENTION

The invention is related to machine vision and more particularly to a method of object recognition within two-dimensional and three-dimensional images.

BACKGROUND OF THE INVENTION

The main computational paradigm for object recognition within both 2D intensity and 3D range image processing is based upon feature extraction. Features are properties that can be efficiently and reliably extracted from both a model and an image. Model and/or image features are typically composed into structures for efficient indexing and comparison. Examples of feature extraction are outlined in Interpretation Tree method by W. E. L. Grimson and T. Lozano-Perez in "Model-based object recognition and localization from sparse range or tactile data" (International Journal of Robotics Research, 3(3):3–35, Fall 1984), Geometric Hashing by Y. Lamdan and H. J. Wolfson in "Geometric hashing: A general and efficient model-based recognition scheme" (2nd International Conference on Computer Vision, pages 238–249, December 1988), Bipartite Graph Matching by M. Oshima and Y. Shirai in "Object recognition using three-dimensional information" (IEEE Transaction on Pattern Recognition and Machine Intelligence, PAMI-5(4):353–361, July 1983), and so forth. So attractive is the feature extraction paradigm that even methods which can be applied directly to raw image data such as the Hough transform and Geometric Hashing have been augmented to operate on extracted features.

The underlying assumption in all feature-based methods is that the features themselves can be reliably and efficiently extracted. Feature extraction is a type of recognition process, albeit on a limited and simplified set of elements, and is often problematic. The reliability of the extracted features is often dependent upon extrinsic factors. For example, the boundaries of planes and higher order surfaces extracted from range images have been found to be sensitive to the relative position of the model and the sensor. Feature extraction may also be very computationally intensive, even more so than a subsequent recognition phase. A final limitation is that feature extraction methods are specific to certain feature types, and are restricted in application to objects that contain those features.

The Interpretation Tree method is an alternative to feature extraction that can operate on very sparse data by exploiting the geometric constraints between low level data descriptors. If the image data is dense, then another alternative is to use template matching. In cases where a meaningful template is defined, template matching is an attractive method due to its simplicity and robustness. The straightforward brute-force method of template matching is simply to translate the template to all possible image locations, and compare all template pixels with the overplayed image window. The similarity metric is typically either the sum of absolute differences, or the cross correlation. The main practical limitations of the brute-force approach is its computationally expensive: for m template pixels and n image pixels, matching a single template at all image locations requires $m^2(n-m+1)^2$ pixel comparisons.

A method for reducing the computational expense of template matching is to order the sequence in which the template and image pixel pairs are compared at a given image location. Pixels with a high-expected difference from a randomly selected image pixel are compared first, increasing the likelihood that an error threshold, which signifies a mismatch, is exceeded prior to comparing all pixel pairs. Another approach to improve efficiency is to organise the matching process hierarchically. A two-stage method is described by Gordon J. Vanderbrug and Azriel Rosenfeld in "Two-stage template matching" (IEEE Transactions on Computers, C-26(4):384–393, April 1977) where the first stage consists of matching a sub-template, which is a subset of the template pixels, at each image location. Only those image locations with a high first stage score are further processed with a full template match in the second stage. Hierarchical structures involving multiple levels of resolution are also known.

Whereas the above methods consider the performance of matching a single template against an image, other methods have been developed to improve the efficiency of matching a set of templates against an image. The best known of these is the Generalized Hough Transform also known as Pose Clustering, which has been known for some time to be equivalent to template matching. Another method, proposed by H. K. Ramapriyan in "A multilevel approach to sequential detection of pictorial features' (IEEE Transactions on Computers, 1:66–78, January 1976), organises a set of templates into a structure called a template tree. The leaves of the tree correspond to distinct templates from the set, and each intermediate node correspond, to a representative template (RT), which is the union of all of its descendant templates. As the tree is traversed, the node whose RF rbest matches the image location is expanded further. Experimental results on synthetic 2D intensity images showed that, for a set of 36 templates, the efficiency improved by a factor of 4 as compared with the brute-force approach.

With some exceptions the described template matching methods have been applied only to two-dimensional imagery. Working with three-dimensional range imagery, Newman et al. applied template matching to an automated industrial inspection process that verified the known position and shape of an object. This is described by Timothy S. Newman, Anil K. Jain, and H. R. Keshavan in an article "3d CAD-based inspection: Coarse verification" (Proceedings of the 11 th International Conference on Pattern Recognition, 1:49–52, August 1992). As the position of the object was constrained, there was no search component to identify the template location in the image. To enhance efficiency, only sub-templates were matched, and experimentation showed that just 1% of model datum points were required for robust results, allowing 5° variation in orientation and 0.25 inches of translation positional inaccuracy. This work was extended to allow some unknown constrained positional parameters, 3 translational and 1 rotational, which, prior to the template matching phase are resolved using a silhouette method.

It would be advantageous to provide an efficient method of recognisinig objects within a three-dimensional range image.

OBJECT OF THE INVENTION

It is an object of the present invention to provide a method of recognising objects within a three-dimensional range image that overcomes known limitations of the prior art.

SUMMARY OF THE INVENTION

According to the invention there is provided a method of recognising objects within an image comprising the steps of:
a) providing contents of a plurality of elements within the image;

b) providing a data structure comprising a plurality of nodes, a node associated with a relative location of an element from the plurality of elements wherein some nodes are associated with at least an object pose;

c) selecting a first element from the plurality of elements, the first element having a predetermined characteristic and a first location;

d) selecting a current node from the plurality of nodes;

e) in dependence upon the data structure and a characteristic of contents of an element at an element location associated with the current node and the first element location, selecting another node as the current node;

f) if a current node has a predetermined node type, repeating steps (e) and (f); and, g) storing information relating to a plurality of object poses associated with at least the current node, some of the plurality of object poses relating to incorrectly recognised object poses.

In an embodiment there is a further step of verifying the object poses related to the stored information.

According to the invention there is provided a method of recognising objects within an image comprising the steps of:

a) providing contents of a plurality of cells within the image, the contents having a characteristic comprising one of surface wherein a surface within the image intersects the cell, free wherein the cell lies between a sensor and a surface-valued cell, occluded wherein the cell lies beyond a surface-valued cell from the sensor head, and unknown wherein the cell lies outside of the image;

b) providing a data structure comprising a plurality of nodes, a node comprising at least one of a parent node and descendant node, wherein a parent node is associated with a descendant node and a node without descendant nodes is a leaf node, wherein nodes of the data structure are associated with relative cell locations, wherein associations between nodes of the data structure are based on a characteristic of at least the cell associated with the parent node, and wherein leaf nodes are associated with at least one of object pose, object type, and object location;

c) selecting a first cell from the plurality of cells, the first cell having a predetermined characteristic;

d) selecting a current node from the plurality of nodes;

e) when the current node is a leaf node selecting a previously unselected descendant node of a previously selected node and when the current node is other than a leaf node, in dependence upon a characteristic of a cell at the cell location associated with the current node and the data structure, selecting a descendant node associated with the current node and based on the characteristic of the current node, as the current node;

f) in dependence upon the characteristic of the cell associated with the current node, determining a likelihood that the first cell is part of an image of an object to be recognised;

g) if the node has a predetermined node characteristic, storing information relating to the object, the information comprising at least one of an object type associated with the current node, an object location associated with the current node and an object orientation associated with the current node;

h) when less than a predetermined amount of information is stored and when the determined likelihood is above a threshold likelihood, repeating steps (e) to (h); and, i) verifying some of the objects to be recognised in dependence upon the stored information.

According to the invention there is further provided a method of recognising objects within an image comprising the steps of:

a) providing contents of a plurality of cells within the image, the contents having a characteristic comprising one of surface wherein the voxel intersects with the surface of the model, free wherein the voxel lies between a sensor and a surface-valued voxel, occluded wherein the voxel lies beyond a surface-valued voxel from the sensor head, and unknown wherein the voxel lies outside of the image;

b) providing a data structure comprising a plurality of nodes, a node comprising at least one of a parent node and descendant node, wherein a parent node is associated with a descendant node and a node without descendant nodes is a leaf node, wherein nodes of the data structure are associated with cell locations, wherein associations between nodes of the data structure are based on a characteristic of at least a cell associated with the parent node, and wherein leaf nodes are associated with at least one of object pose, object type, and object location;

c) selecting a first cell from the plurality of cells, the first cell having a predetermined characteristic;

d) selecting a current node from the plurality of nodes;

e) when the current node is a leaf node selecting a previously unselected descendant node of a previously selected node and when the current node is other than a leaf node in dependence upon a characteristic of a cell at the cell location associated with the current node and the data structure, selecting a descendant node associated based on the characteristic with the current node as the current node;

f) in dependence upon the characteristic of the cell associated with the current node, determining a probability that the first cell is part of an image of an object to be recognised;

g) if the probability is above a predetermined threshold, storing information relating to the object, the information comprising at least one of an object type associated with the current node, an object location associated with the current node and an object orientation associated with the current node and repeating steps (e) to (g).

h) verifying some of the objects to be recognised in dependence upon the stored information.

According to yet another embodiment of the invention, there is provided a method of recognising objects comprising the steps of:

a) providing an image;

b) selecting a first point within the image, the point having a characteristic, and adding the point to a first set;

c) if fewer than a first number of object poses is consistent with characteristics and locations of points in the first set, performing one of adding the object poses to a second set and verifying some of the number of object poses consistent with characteristics and locations of points in the first set;

d) if at least a first number of object poses is consistent with characteristics and locations of points in the first set, determining a location of a next point based on contents of the first set and the object poses consistent with characteristics and locations of points in the first set;

e) adding the determined next point to the first set; and, f) until one of the first point forms part of an object pose and the first point forms part of no object pose is determined repeating steps (c) to (f).

An advantage of the present invention is robust object recognition having improved efficiency over prior art methods.

BRIEF DESCRIPTION OF THE DRAWINGS

Exemplary embodiments of the invention will now be described in conjunction with the following drawings, in which:

FIG. 1 is a diagram of two object models, one of a duck and one of a boat, and diagrams of the models with a plurality of cells overlaid thereon;

FIGS. 10a, b, and c are diagram showing a sensed range image, a recognised object therein, and both the sensed image and the recognised object in a same view;

FIG. 12a is a table showing values within an Error model;

FIG. 12b is a table relating to voxel resolution of a decision tree;

FIG. 12c is a table showing results for synthetic image tests;

FIG. 12d is a table showing numbers of successful trials for real image tests performed; and, FIG. 12e is a table of information relating to results of tests of an embodiment of the invention conducted with real image data.

DETAILED DESCRIPTION OF THE INVENTION

Figure 2:
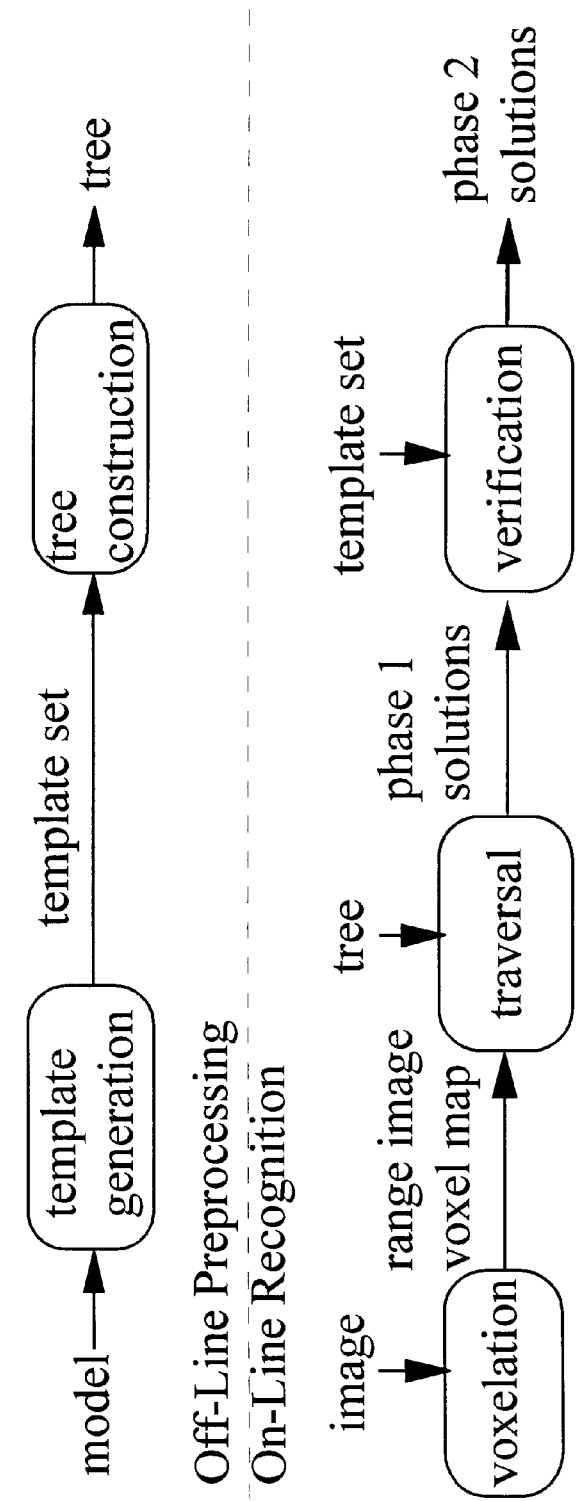
FIG. 2 is a simplified high level flow diagram of a method according to the invention.

In the description of an exemplary embodiment that follows, images are divided, for analysis, into elements in the form of cells. A cell is a portion of the image space. For example, the term voxel refers to a volume element. This applies to a three-dimensional application of the invention. For two-dimensional application, a pixel is an image point. For dimensions beyond three, such as those provided by three dimensional filming wherein time forms a dimension, another type of cell is used. Of course, elements are not limited to cells and may include points in three-dimensional images and other definable data indexes or locations within an image.

According to the invention, a search strategy that incrementally queries a range image for surface data is employed. Optimally, the method queries for data where it is most likely to occur. According to the strategy a point having a predetermined characteristic such as falling on a surface is hypothesised to fall on an object being recognised. In other words, an intersection of a point within a model with some selected image point is performed. This is followed by a search for additional surface data at locations relative to that point which have a high likelihood of falling on the object's surface or alternatively, of providing a maximum amount of information. At each increment, the image is queried for the existence of surface data at a specific spatial location, and the set of possible object poses—positions and orientations of an object—is further restricted. With each new surface point tested during the search, the initial hypothesis is determined to be probably correct, possibly correct, or incorrect. Eventually, an object is identified, localised, and that identification is verified; alternatively, the initial hypothesis is refuted.

A pose as used throughout this disclosure and the claims which follow refers to an object in a particular orientation and relative position. For example, with a one degree quatisation, a two-dimensional image has 360 different orientations and when a single pixel is selected, a number of relative positions related to the number of pixels within the image having a same pixel value. This of course ignores issues of symmetry. Once further pixels are selected, the number of positions and orientations is reduced since the plurality of pixels is likely consistent with fewer relative positions and orientations. As is evident to those of skill in the art, performing image correlations with 360 orientations for each of a number of relative positions is time consuming. Further, increasing or decreasing resolution result in further disadvantages.

In order to implement a search of surface points according to the invention, a tree data structure is traversed. A decision tree classifier for use according to the invention is pre-compiled in order to facilitate implementation of the method. The decision tree classifier is used for classification, a pattern recognition process where an input vector in some n-dimensional feature space is determined to fall within some feature space region or class. A single-stage classifier determines a similarity metric based upon all n input vector components and compares this against all classes. In cases where either the dimension of the input vector or the number of classes is large, it has been found that it is more efficient to use a multi-stage classifier, which considers only a small number of feature vector components at each stage, thereby reducing the set of possible classes that are compared at each successive stage.

A decision tree classifier is one type of multi-stage classifier. A thorough treatment of decision tree classifiers is presented by Leo Breiman, Jerome H. Friedman, Richard A. Olshen, and Charles J. Stone in "Classification and Regression Trees" (Wadsworth Inc., Belmont Calif., 1984). Decision tree classification has been applied to 2D imaging applications in the field of remote sensing, medical imaging, and optical character recognition.

The root of a decision tree represents the entire set of classes and each interior node represents a subset of the classes associated with its parent node. A leaf node represents either a single class, or a small set of classes. In addition to a class set, each non-terminal node—a node that is not a leaf—has an associated feature set and decision rule. When traversing the tree, the decision rule is applied at each node to the associated feature subset of the input vector to determine which descendant branch to follow. The decision rule simultaneously measures the similarity of the feature subset with all remaining possible classes, and reduces their number accordingly.

The following sections describe the method for the recognition of a single rigid 3D object positioned arbitrarily and sensed with dense range data. The method consists of an off-line pre-processing stage in which the decision tree is composed, and an online recognition stage in which the tree is traversed. The major processing steps and data structures are illustrated in FIG. 2. The method operates in the discrete domain. Both the object model and the range image are represented by voxel maps, which are regular grids of cubic volume elements. The resolution of the voxel map, i.e. the size of each voxel, plays an important role in the practicality of the method. Preferably, the resolution is coarser than the—range data, so that a continuous sensed surface is mapped into a connected set of voxels, but not so coarse that generated templates are indistinct, thereby reducing a system's ability to distinguish the object uniquely. Preferably, the voxel resolution is not too fine, requiring many templates and reducing efficiency. A trade-off exists between the voxel resolution and the recognition efficiency and reliability.

The method of the present invention is also applicable to non rigid objects and objects capable of a plurality of configurations such as a briefcase which can be opened and closed a book, a flexible necked lamp, and so forth. When applied to objects that are not rigid, the time to pre-compile the tree is often significantly increased. That said, the performance of such a system once the tree is compiled is a significant improvement over performance of systems known in the art; the performance of the system is dependent upon the nature of the non-rigid object.

Template Generation

A template is a collection of voxels having a characteristic in the form of intersecting the surface of a model in some pose, e.g. translation and orientation. All co-ordinates are described in a reference frame—for example, that of the sensor—including the model pose and range data. When a pose space is defined as a domain of possible model poses, the most general pose space is 6 dimensional. Constraints on the object position relative to the sensor, such as a tabletop sensing environment, can act to reduce the dimensionality of the pose space.

A template represents a single camera-frame view of the model at some pose within its pose space. A distinct template is generated for every pose where the model surface intersects with some reference point, in the form of the camera frame origin. In this way, the template generation is similar to Aspect Graph methods, with the exception that the features used in Aspect Graph methods are invariant to translation and the orientational degrees of freedom. According to the method of the invention a distinct template is generated for each translation and rotation within the pose space; the step of pre-compiling the data tree reduces some effects a large number of templates has on performance.

Referring to FIG. 1, examples of templates for a duck and a boat are shown. As is evident from the templates, the use of range sensors in capturing the templates results in a single surface. Points beyond the surface, occluded points, are not discernible. Therefore, a method of matching templates to objects within range images is inherently limited to surface points of an object in three-dimensions.

Template Filtering

As can be seen in FIG. 1, for a given pose some of a model surface is occluded from a range sensor vantage. Only those voxels resulting from non-occluded regions of the model's surface are included in a template. An occlusion filter is applied during template generation that simulates the acquisition of a range image of the model in the specified pose, and removes occluded range points that would be absent from an image captured from a same vantage. The filter assumes that occlusions occur parallel to a z-axis of the camera frame.

An anti-aliasing filter commonly referred to as a smudge filler is applied to each template to reduce effects of quantisation error. The smudge filter functions by generating a number of model poses that differ from the nominal pose by a sub-resolution translation and orientation. The number of poses in which the model surface intersects with each voxel are accumulated in a histogram, and only those voxels whose values exceed a specified percentage of the total number of smudged poses are included in the template. In this way, voxels that intersect only slightly with the model surface at any given locations are not included in the template as they are unlikely to be detected in an acquired range image.

Pose Space Quantisation

The resolution of the orientation component of the discrete pose space is a function of both model size and the voxel space resolution. The resolution of the orientation component is determined as a minimum rotation for displacing a point on the model surface by one voxel length; mathematically, the point is a furthest point from the centre of rotation.

If the orientation resolution were greater than this minimum amount, a sensed object can fall in an intermediate pose not adequately represented by the template set and thereby resulting in a failure in the recognition phase. An orientation resolution less than this amount results in more templates than necessary for recognition and reduces efficiency.

Similarly, for any given orientation, the number of discrete translational pose components is equal to the number of voxels that intersect the model surface at that orientation value. For example if for a given orientation value, the model surface intersects n voxels, there are n distinct templates corresponding to n poses and translate each voxel to the sensor frame origin. The number of templates is therefore directly proportional to the size of the model, and inversely proportional to the voxel space resolution.

Tree Construction

The generated template set is transformed into a decision tree classifier. Preferably, the tree has a binary structure, each non-terminal node having exactly two descendant nodes. Optionally, each node has more than two descendant nodes. The class set of each node is a set of templates, called the node template set. A leaf node represents either a small set of templates, or a null set. A parent node represents a larger set—the union of the template sets of all of its descendant nodes. Each parent node also has an associated feature set, which is a single voxel called the node voxel. The node voxel is that voxel which is most common to the node template set.

For n templates, a perfectly balanced binary tree has a depth of $d=\log_2 n$. While the pre-compiled tree structures are by design imperfectly balanced, the average depth is still quite small; examples of tree structure depths are shown in the table of FIG. 12b. This is a factor contributing to the time efficiency of a method of recognition according to the present invention.

In an embodiment, a representation used to construct the tree is a voxel map in the form of a histogram. The voxel map has the same resolution as the templates, and the value of each histogram voxel is a count of the number of templates containing a surface point at that voxel.

According to the embodiment, tree construction commences by assigning a root node template set equal to the complete set of templates, and constructing a histogram for this node. By definition, every template in the set contains the origin voxel, and so the histogram voxel located at the camera frame origin will have a value equal to the cardinality of the complete template set.

Figure 2A:
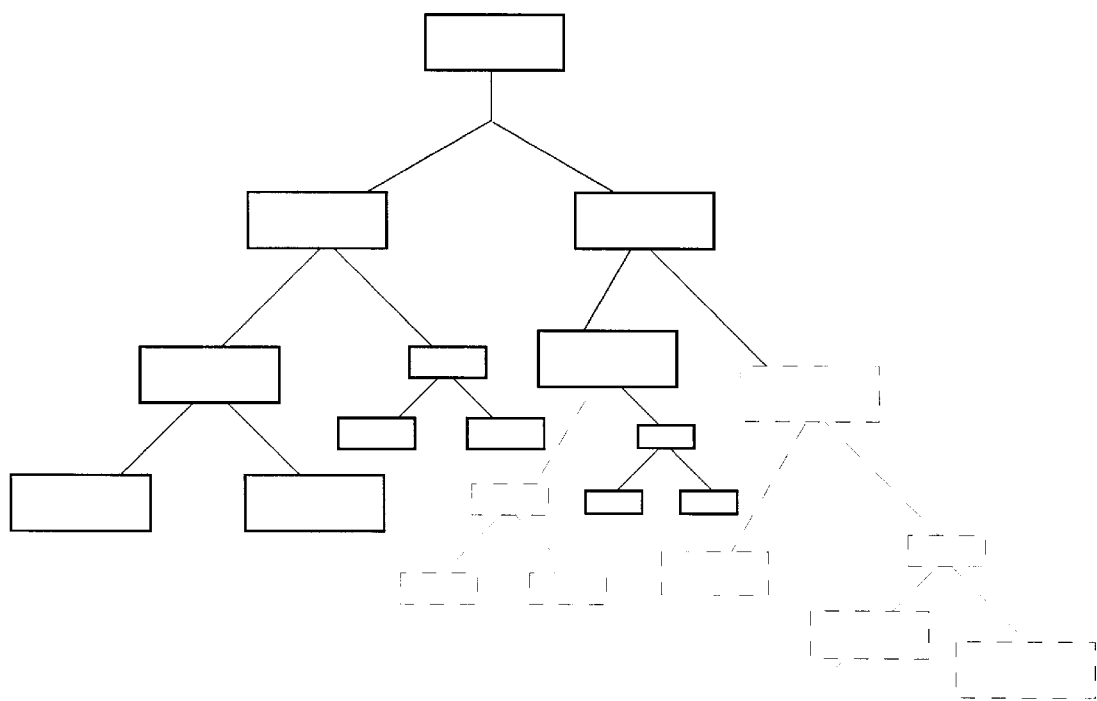
FIG. 2a is a simplified diagram of a tree data structure comprising nodes according to the invention.

The largest non-origin histogram voxel is identified next. This voxel is common to the greatest number of templates in the node template set, and the node voxel is set to reference this voxel. If there are two voxels with the same maximum value, then one is arbitrarily chosen. According to an embodiment of the method of the invention, voxels are selected based on information available therefrom. For example, a voxel with a value distinguishing between two sets containing a large number of possible poses is a desirable next voxel. Because many poses as shown in FIG. 2a are eliminated by information at some voxels, the pre-compiled tree appears imbalanced. Those nodes appearing in FIG. 2a in dashed line, represent continuation of possible poses all of whom are eliminated by the node precluding inclusion of nodes associated with those poses. As such, a pre-compiled tree structure is often significantly imbalanced.

The two descendant nodes of the current node, and their associated histograms, are generated next. The histogram for the descendant node indicative of a surface at the voxel location is created by adding all templates from the parent node template set which contain the parent node voxel. Conversely, the histogram for the descendant node indicative of an absence of a surface at the voxel location is created by adding all templates from the parent node template set which do net contain the parent node voxel. The template sets of the descendant nodes are therefore disjoint, and their union is equal to the parent node template set.

This process is recursively repeated for both dependant nodes. When the cardinality of any node template set is less than some predefined minimum, then that node is designated as a leaf and no further branching extends from it. The process continues until all branches terminate. Referring to FIG. 2a, it is evident that when a determination that a branch does not coincide with the hypothesis, the branch is abandoned. Though this likely occurs at a single node, as stated above, many descendant nodes negating the hypothesis are represented by the single node. The resulting tree once compiled is often skewed with respect to actual nodes because descendant nodes below a node where a branch is abandoned are not included in the pre-compiled tree. These nodes are shown in dashed line in FIG. 2a.

Recognition

Recognition comprises finding templates that best match the image data at each image location; of course a result that no template is a best match is also possible. The brute-force method of recognition is therefore simply to calculate the similarity metric of each template at each surface-valued image voxel location. This is a highly reliable method that is very likely to find all correct solutions, but for any reasonably large template set is clearly inefficient. Alternatively, according to the present invention, at each image location a path is traversed through a decision tree classifier determining one or more leaf nodes containing likely solutions. A similarity measure is performed only for those templates determined to be likely solutions; this is a much reduced candidate set of templates.

Image Voxelation

Prior to tree traversal, the range image is quantised into a voxel map, called the image voxel map. Each voxel in the range image voxel map takes on one of four values:

surface (S): the voxel irtersects with the surface of the model;

free (F): the voxel lies between the sensor head and a surface-valued voxel;

occluded (O) the voxel lies behind a surface-valued voxel from the sensor head;

unknown (U) the voxel lies outside of the sensing frustum.

An example of the surface-valued voxels of a voxelated range image is illustrated in FIG. 7. Voxel resolutions used in experiments were coarser than is typically considered acceptable in image processing.

Reversal

There are many alternative methods of tree traversal or search, all of which aim at striking a balance between reliability and efficiency. Any method that optimises reliability is likely too inefficient to be practical. In the embodiment disclosed efficiency is increased at the expense of reliability. There are three reasons to use a tree traversal algorithm with sub-optimal reliability.

1. There are a number of acceptable solutions. The method is discrete, so that a template will resolve a model pose only within a finite accuracy. If greater accuracy is required, an additional processing step, such as an Iterative Closest Point Algorithm (ICPA), is used to refine the pose. For a reasonably fine quantisation, there are likely to be a number of neighbouring values in the discrete pose space which fall within the ICPA potential well of the true pose, any of the corresponding templates of which provide an acceptable solution.

2. There are a number of chances to succeed. The method tests each surface-valued image voxel in turn. As long as the reliability is high enough so that recognition succeeds for at least one voxel that falls on the object's surface, then other traversals can fail without affecting the overall recognition rate.

3. False positives are acceptable. The results of the tree traversal are passed to a verification phase, which further filters the solutions of the traversal. The overall reliability only suffers significantly when the traversal is too strict—ruling out potentially correct solutions. Of course, when the traversal is too lenient in its selection of solutions, efficiency is reduced.

In an embodiment, a surface-valued image voxel is initially randomly selected as a seed, and the tree traversal is effectively testing the hypothesis that the seed voxel is that voxel, by construction, common to all templates. This is equivalently expressed as a hypothesis that in some as yet unknown pose, the surface of the object intersects with the seed voxel. Let the object model be denoted as M, and the seed voxel as $v_o$. Traversing the tree is equivalent to testing the hypothesis $H_o$:

$$H_o: V_o \in M$$

$H_o$ is tested by sampling the image voxel map relative to $v_o$ at the sequence of node voxels along the traversed path. By construction, any node voxel is the most likely to be surface-valued for the given node template set. As the traversal proceeds, the image is therefore queried for the existence of surface data where it is most likely to occur, if $H_o$ is true. When the queried node voxel is surface-valued, then the descendant branch indicative of the voxel containing a surface location is further expanded; otherwise, the traversal follows the alternative descendant branch. Optionally, descendant branches indicating occluded voxels are also provided. As the traversal proceeds, at each subsequent node the set of model poses that can satisfy $H_o$ is partitioned and reduced, until eventually a leaf node is encountered and the traversal terminates. Alternatively, the traversal terminates when a probability of the hypothesis being correct is above a predetermined threshold.

If the template set of this leaf node is empty, then $H_o$ has been refuted, and it is determined that the selected seed voxel does not fall on the model. If the leaf node template set is non-empty, then $H_o$ has been supported, and the seed voxel may indeed fall on the surface of the model in the identified poses. Of course, verification of potential recognised objects is required to determine at least a "best" recognised object.

Error Model

If the image voxel map values were completely accurate, then the above-described depth-first traversal would be reliable and would indeed be the most efficient method of tree traversal. For real image data, however, errors exist causing incorrect values in the image voxel map, Any incorrect image voxel value may lead to an incorrect branching decision, which in turn obscures a correct solution.

The reliability of the tree traversal is improved by utilising a best-first search based upon an error model of the data. The error model admits noise and occlusion as the two sources of error. Noise errors include both sensor noise, which is very low for current range imaging, sensors, and quantisation error. Occlusion error when a surface of the object under recognition is masked by some other surface. In either case, the effect of the error is to assign an untrue value to an image voxel.

Let $e_n$ and $e_o$ denote the probability that an image voxel has an incorrect value due to noise and occlusion errors respectively. In our simple error model, we assume that these probabilities are constant for all voxels though other more elaborate error models may also be used. For example, a true free-valued voxel (F) can be sensed as surface (S) if either a noise error $E_n$ occurs without an occlusion error $E_o$, or $E_o$ occurs without $E_n$:

$$(E_n \wedge \overline{E}_o) \vee (\overline{E}_n \wedge E_o) \qquad (2)$$

In the table of FIG. 12a are listed conditional probabilities that an image voxel's sensed value is equal to its true, value, which we call the fidelity of an image voxel, and the associated error events. Note that according to this error model, free-valued voxels are sensed more reliably than surface-valued voxels, which is intuitively agreeable. Also, the values of the unknown voxel,-, are completely certain, as they are based entirely upon the geometry of the sensor's field-of-view, independent of any signal.

Best-First Traversal

The depth-first search assumes that each image voxel value is correct and follows a path to the exclusion of all others. According to an embodiment of the invention an error model is used to guide a tree traversal based upon a tentative or backtracking best-first strategy. The best-first strategy applies the error model at each image voxel query, and an aggregate fidelity is maintained for each path. This path fidelity is the running average of all of the path node fidelities, and is a measure of likelihood that the voxel values of path nodes reflect true image voxel values. At each node rather than following only one descendant node based on characteristics of a parent node's associated voxel, path fidelities are calculated for each descendant; the descendant paths are added to a list of partial paths. During each iteration, traversal continues from a partial path having a substantially maximum fidelity. Of course, once traversal of a path is substantially complete, the path is no longer "partial" and another path is traversed.

For example, let $\pi$ be a path of length $N_\pi$ terminating at a parent node $t_i$. Let the fidelity of $\pi$ be $f_\pi$, and assume that querying a current node voxel within the image for $t_i$ is free-valued. Then, when a binary tree structure is employed, the new paths $\pi_\alpha$ and $\pi_\beta$ are added to the partial path list for respective true and false descendant nodes. The fidelity of the true branch is calculated as $$f_{\pi_\alpha} = \frac{N_\pi f_\pi + P(S/F)}{N_\pi + 1}$$

and the fidelity of the false branch as $$f_{\pi_\beta} = \frac{N_\pi f_\pi + P(F/F)}{N_\pi + 1}.$$

When an erroneous image voxel value causes the traversal to proceed down an incorrect branch, then the true template will necessarily be obscured, as each template is a member of only one leaf node. There is one of two possible outcomes when this occurs. If the incorrect branching occurs early enough in the tree traversal, then subsequent queries to the image voxel map likely act to reduce the probability significantly and the traversal terminates at a leaf node. Possibly the incorrect branching occurs when an erroneous image voxel is encountered deep in the tree traversal, in which case the selected branch may indicate another potential solution.

To offset the negative effect of an early incorrect branching, tree traversal does not terminate when a first leaf node is encountered. Rather, traversal continues expanding paths with a highest fidelity until a specified number of complete paths are found. The specified number is referred to as heuristic power of a search, denoted by h. If an erroneous image voxel value causes a path to terminate first at an incorrect leaf node, then the search has h−1 other opportunities to backtrack and traverse a correct path.

Each solution path has an associated fidelity. Let $f_T$ denote a threshold used to filter results from traversals. If the fidelity $f_{90}$ of a solution path $\pi$ is less than $f_T$, then templates identified at a leaf node are unlikely solutions, and are not considered further. If $f_{90}$ is greater than $f_T$, then those templates are provided to a verification phase.

Searching for an object terminates when each image voxel indicative of a surface within the image has in turn been selected as a seed. This enables recognition of a number of possible instances of an object or of different objects in an image. Optionally, when an object is recognised, its surface voxels are excluded from further selection as seeds.

Alternatively, the traversal terminates when the path probability is below a predetermined threshold. Such a method prevents paths with few or no matching voxels from reducing efficiency; however, when occlusion occurs, such a method increases potential for failing to recognise an object within an image.

Further alternatively, the traversal terminates when the probability is below a predetermined threshold and when the traversal is below a predetermined depth within the tree structure. This reduces dependence upon a small set of voxels, each of which could contain errors. When tree traversal is terminated for probabilities below a predetermined threshold, a tree is constructed to reduce a likelihood that one or more occluded sections of an object within a range image affects object recognition.

Verification

Potential solutions determined using tree traversal are provided to a verification phase, which measures a similarity between the results at the seed location. Let $w_i$ be a template of $m_i$ voxels $\{v_1, v_2, \ldots v_m\}$ and let $v_s$ be the image seed voxel. The similarity measure $r_i^s$ is defined as $$r_i^s = \frac{1}{m} \sum_{j=1}^{m} \delta((v_j + v_s) = S) \quad (3)$$

where $\delta((v_j+v_s)==S)$ is a Boolean function indicating whether a voxel located at $v_j$ relative to $v_s$ is surface-valued.

In the verification phase, $r_i^s$ is calculated for all $w_i$ passed from the tree traversal phase, and compared against a threshold $r_T$. When $r_i^s > r_T$, then $w_i$ is accepted as a solution at $v_s$. Alternatively stated, each potential object, object location, and object orientation are verified to determine a presence or absence of the object. Since the tree traversal provided the verification phase with a limited set of potential poses, verification does not significantly affect efficiency as compared to prior art methods. Verification according to the invention allows for improved matching over tree traversal alone.

Experimentation

A method according to the invention and described above has been implemented and tested using object models of two objects, a wooden duck and a toy plastic boat. Triangular-mesh surface models of the objects, which were composed from a complete set of range images, were used to generate the template set. Alternatively, the template set is constructed directly from the range data. FIG. 1 illustrates the object models with example templates. These objects were chosen because they have irregular features, particularly in the case of the duck, which was hand sculpted.

For the experiment, the objects were constrained to lie in their obvious stable poses on a table surface; this allows translation in the x–y plane and orientation about the z-axis. A range sensor was mounted above and pointing towards the table along the negative z-axis, and was allowed to translate along the z-axis. Degrees of positional freedom of the objects and the sensor resulted in a four-dimensional pose space.

The voxel resolution was set sufficiently fine to distinguish between a large set of poses at 0.015 m. The resolution of discrete pose space is calculated based upon a maximum diameter of the models in an x–y plane. Characteristics of the pose space, generated template sets, and resulting tree structures for the two objects are tabulated in the table of FIG. 12b.

According to the contents of the table of FIG. 12b, a number of templates are associated with a single leaf node, particularly in the case of the boat model. Tree construction according to the invention aims to provide a substantially maximum amount of information at each node. By construction, the trees are not perfectly balanced, and have a greater average depth than a balanced tree with a same number of leaf nodes. For any seed that does not fall on the model surface, the traversal is expected to terminate at a very shallow node. It is expected that in the majority of cases this structure will function more efficiently than a balanced tree. Alternatively, tree construction aims to provide a substantially balanced tree.

Performance Metrics

Two performance metrics are defined to assess the efficiency and reliability of the above-described method. Let $\hat{E}$ be an estimate of efficiency, defined as the number of image voxels which are queried in both the tree traversal and verification phases, relative to brute-force correlation of the entire template set:

$$\hat{E} = \frac{\text{\# of brute-force voxel queries}}{\text{\# of phase-1 and -2 voxel queries}} \quad (4)$$

Although the expression for $\hat{E}$ does not include cost of sorting the partial path list, which adds to the computational expense of traversal, it was determined experimentally that the cost of list sorting is practically quite small.

Let $\hat{R}$ be an estimate of the reliability of the method—an expected rate of successful recognition. In the ideal case, $\hat{E} \gg 1$, and $\hat{R}=1$.

Synthetic Image Tests

The method according to the invention was tested using 200 synthetic range images of each of the object containing isolated instances of a single object model in some randomly generated pose. As the models were isolated in the synthetic images used, there were no occlusions possible and $e_o=0$. There was also no sensor noise, although the randomly generated model poses resulted in quantisation errors, which was estimated at $e_n=0.02$. Results of tests on the duck model for h=1 and 10 are tabulated in the table of FIG. 12c.

The data shows the method to be quite efficient, operating on average 2 to 3 orders of magnitude faster than standard template matching. Executing on a MIPS R8000® processor using non-optimised code, which is rated at 300 MFlops, recognition was achieved in on average 0.017 seconds per seed and 1,039 seconds per image for h=10. The first phase tree traversal was consistently more efficient than the second phase verification, despite the fact that only a small percentage of the complete template set was passed to verification. Due to quantisation error, when the object model was located within an image a similarity measure was not perfect, i.e. r<1. Indeed, although no other objects or ground was contained in the images—every selected seed fell on the model surface—the recognition failed for some seeds due to quantisation error. As every image voxel was in turn selected as a seed, the object model was successfully recognised as long as a single seed per image resolved a solution.

Figure 3:
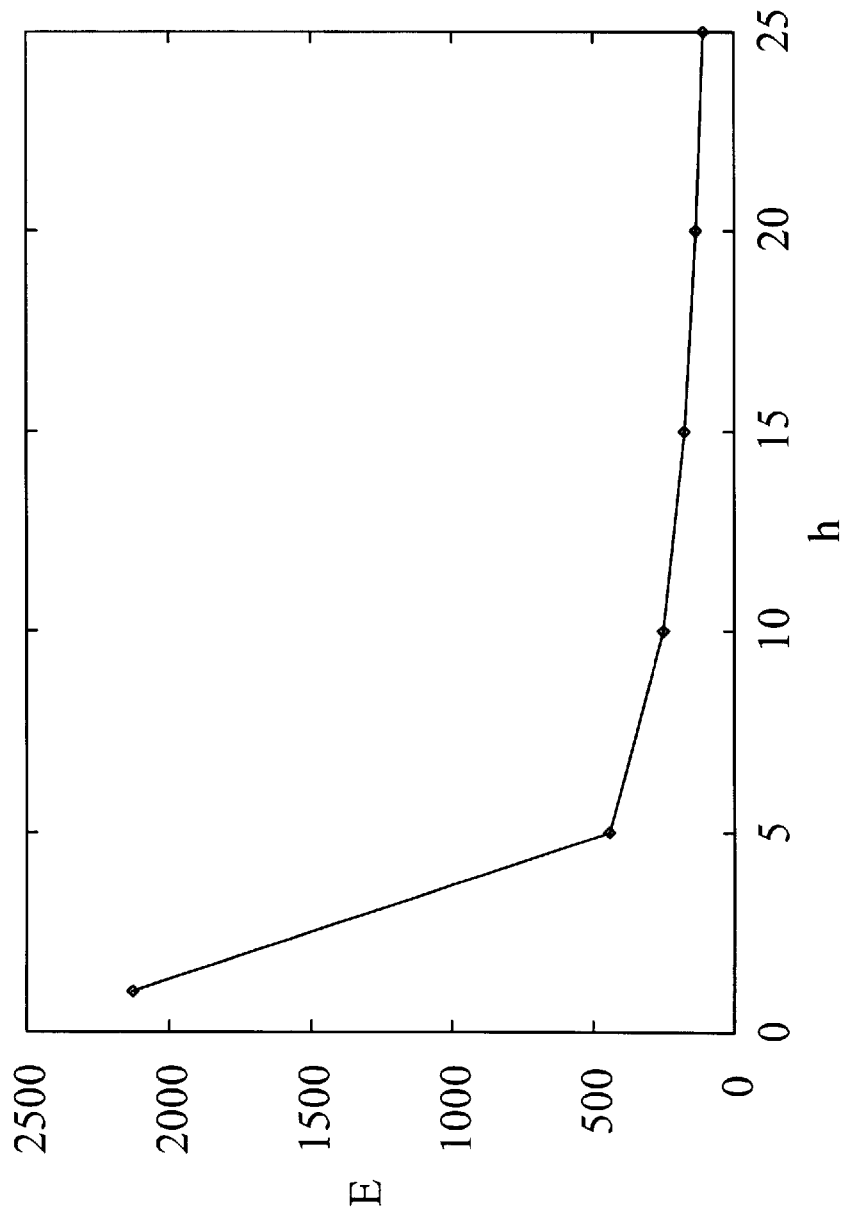
FIG. 3 is a graph of heuristic power vs. average efficiency.
Figure 4:
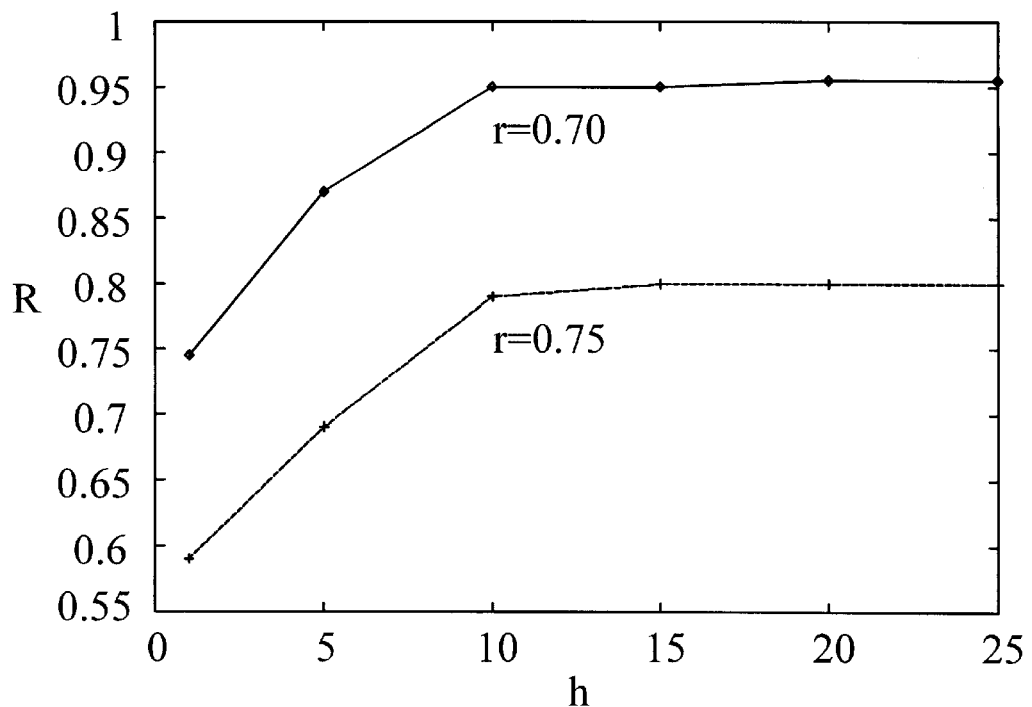
FIG. 4 is a graph of heuristic power vs. average reliability.

The value of the traversal parameter h was varied to assess its effect on performance. As shown in FIGS. 3 and 4, increasing h had the effect of both increasing reliability and decreasing efficiency. The average similarity of a verification phase solution also decreased as h increased, as more potential solutions were passed from the traversal phase to the verificaton phase.

By lowering $r_T$ we are in effect relaxing our acceptance criteria and nominally increasing reliability, as illustrated in FIG. 4. If $r_T$ is too low, discriminatory power of the tree traversal method suffers; other scene elements pass the similarity threshold, effectively increasing the false positive rate. Optionally, when a priori information exists about a scene background, a maximum r of the ground is determined resulting in a lower acceptance bound. Note that $r_T$ has no bearing on the number of templates that are passed to the second phase, and so E is unaffected by changing its value.

Real Image Tests

The method of the invention was further tested on a set of 22 images of the duck object and 12 images of the boat object, in various arbitrary poses. The scenes were not ideal for recognition, and indeed in some of the images the models are particularly occluded. The range sensor used to acquire the data was an early implementation of the auto-synchronised scanning method, which has fallen into disuse, and image noise was greater than that of similar commercially available sensors. The scanner was configured to acquire a 256×256 image within a 30°×40° frustum approximately 0.10 to 0.70 m high.

Three categories of image were acquired for each object: clear images containing only an object to be recognised in an arbitrary pose on a table surface; cluttered images containing other scene elements around the object of interest; and occluded images containing partially obscured objects either by another object, by laying partially outside the sensing frustum, or both. For the duck object, 4 clear, 8 cluttered, and 10 occluded images were acquired, and for the boat, 2 clear, 3 cluttered, and 7 occluded. Each image set was tested for h=5, 10, and 15; the results are summarised in the tables of FIG. 12d and FIG. 12e.

The efficiency ratings were similar to that of the simulated tests (see h=10 for duck object in the table of FIG. 12e and the table of FIG. 12c). The reliability was somewhat poorer than in the simulated tests, as is expected with the introduction of noise, clutter and occlusions. The reliability measure k was based upon human inspection of the results, and is therefore accurate in these tests. If the solution with either the first or the second highest r value was judged to fall within the ICPA potential well, then the trial was deemed successful.

Solutions for some of the more occluded images are illustrated in FIGS. 7–11. Recognition succeeded for all of the clear images, for all values of h. The single cluttered image that did not succeed for h=15 was believed to have significant noise levels. In some cases, recognition succeeded on severely occluded images that were expected to fail, as in FIG. 10. Essentially, a value of h can be found to provide a good balance of reliability and efficiency.

The complexity of the best-first traversal is dependent upon the scene content. In the worst-case, image noise and ambiguity invoke backtracking to an extreme, degrading the traversal to function as a breadth-first search. A single complete path would visit all n−1 non-terminal nodes before arriving it a leaf node.

Fortunately, experimentation has shown that in practice the best-first traversal functions more like a series of h depth-first searches, visiting a on average h $\log_b n$ nodes per traversal. At each visited node, in addition to a single image voxel query, an ordered list of partial paths is maintained. Let k be the average number of sort operations required at each node to maintain the partial path list. The cost of traversing the tree for each image voxel is then O (s(k+1)h $\log_b$ n).

In the verification phase, each template provided from the tree traversal phase is verified. If we let s denote th average e template size, and c the average number of phase 1 solutions, then the complexity of verification is O(cm).

Figure 5:
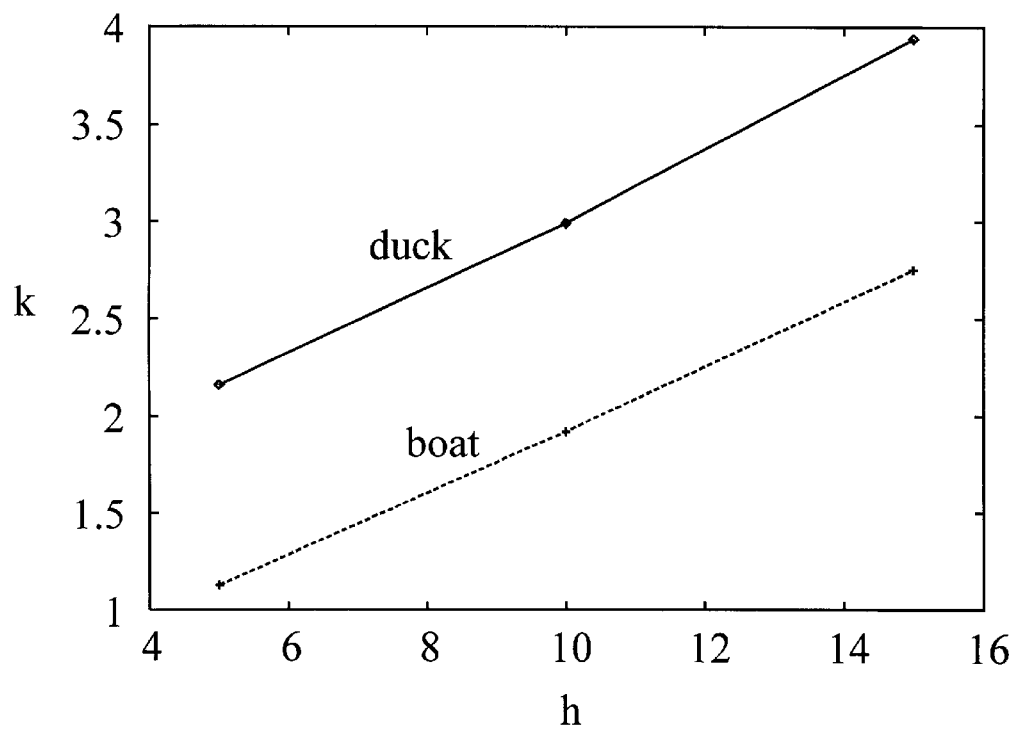
FIG. 5 is a graph of heuristic power vs. average sort operations per node.
Figure 6:
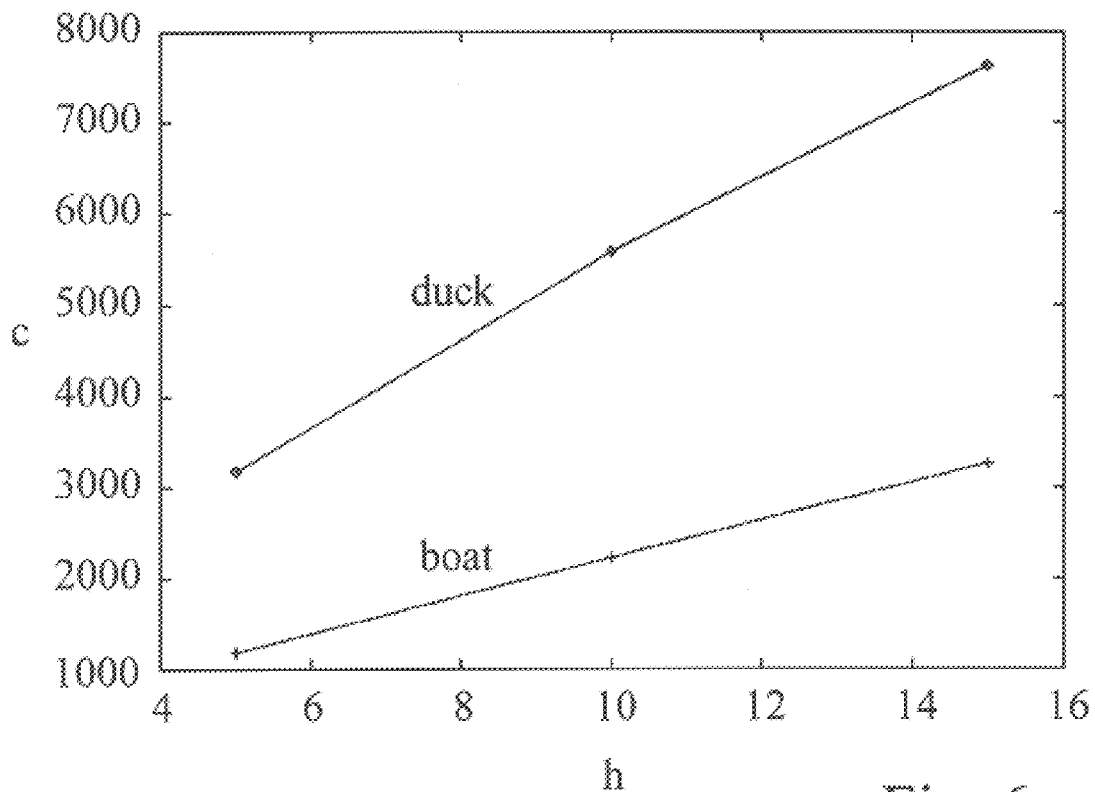
FIG. 6 is a graph of heuristic power vs. average tree traversal solutions per seed.
Figure 7A:
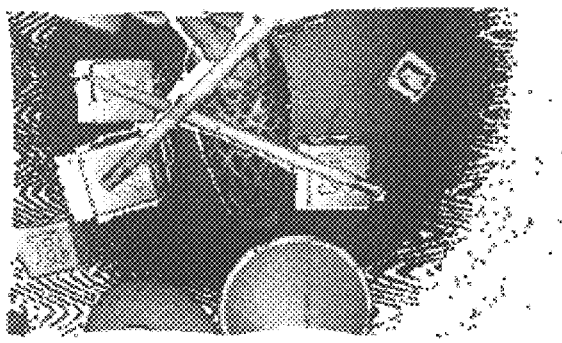
FIGS. 7a, b, c, and d are diagrams of surface-valued voxels of a voxelated range image.
Figure 7B:
Figure 7C:
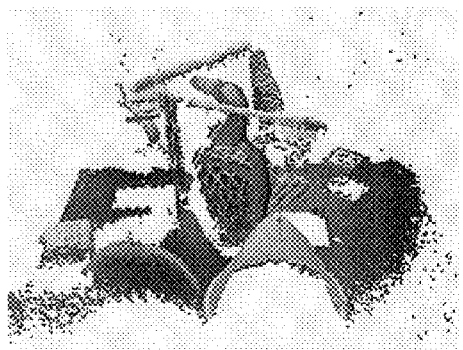
Figure 7D:
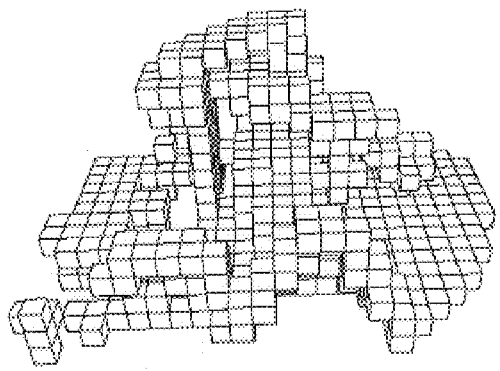
Figure 8A:
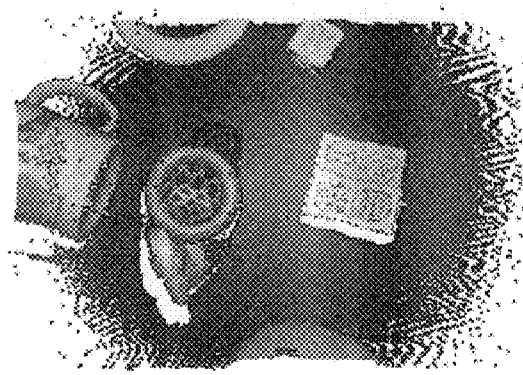
FIGS. 8a, b, and c are diagrams showing a sensed range image, a recognised object therein, and both the sensed image and the recognised object in a same view.
Figure 8B:
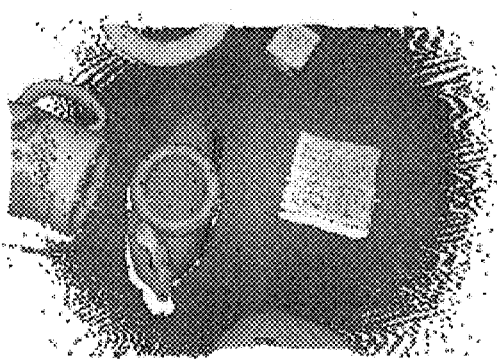
Figure 8C:
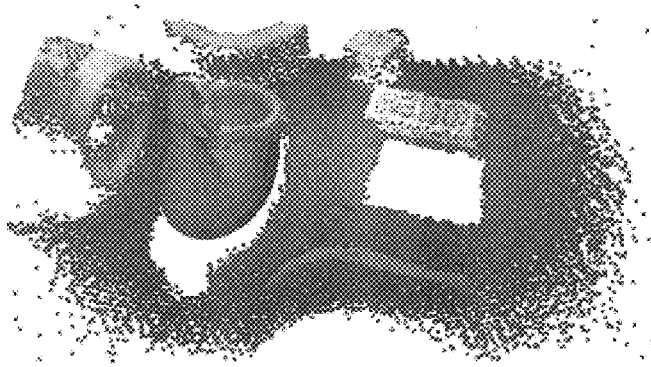
Figure 9A:
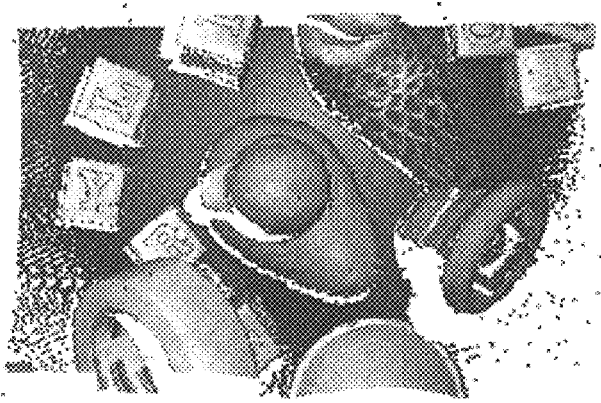
FIGS. 9a, b, and c are diagrams showing a sensed range image, a recognised object therein, and both the sensed image and the recognised object in a same view.
Figure 9B:
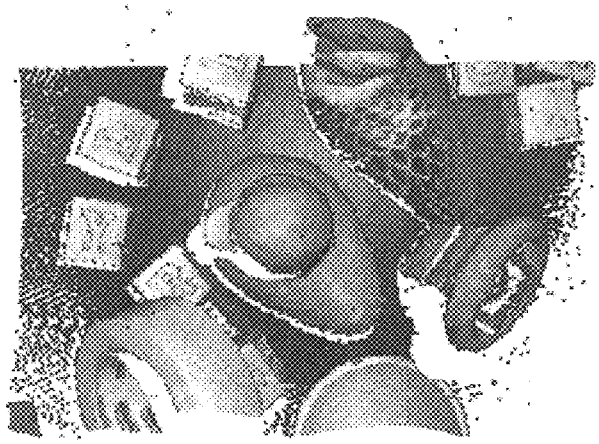
Figure 9C:
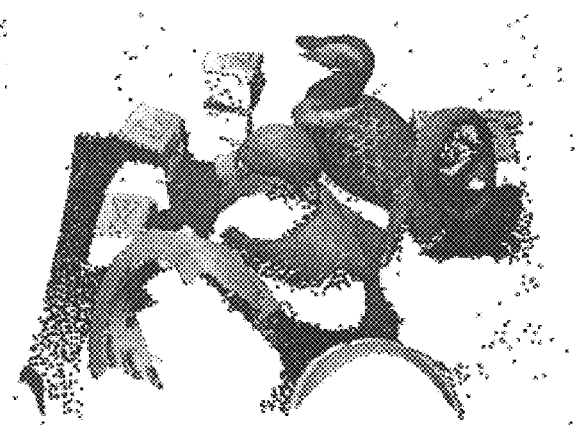
Figure 11A:
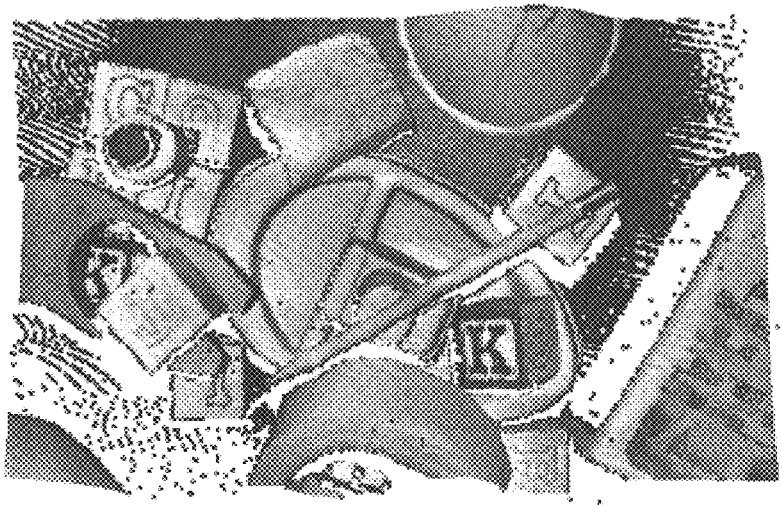
FIGS. 11a, b, and c are diagrams showing a sensed range image, a recognised object therein, and both the sensed image and the recognised object in a same view.
Figure 11B:
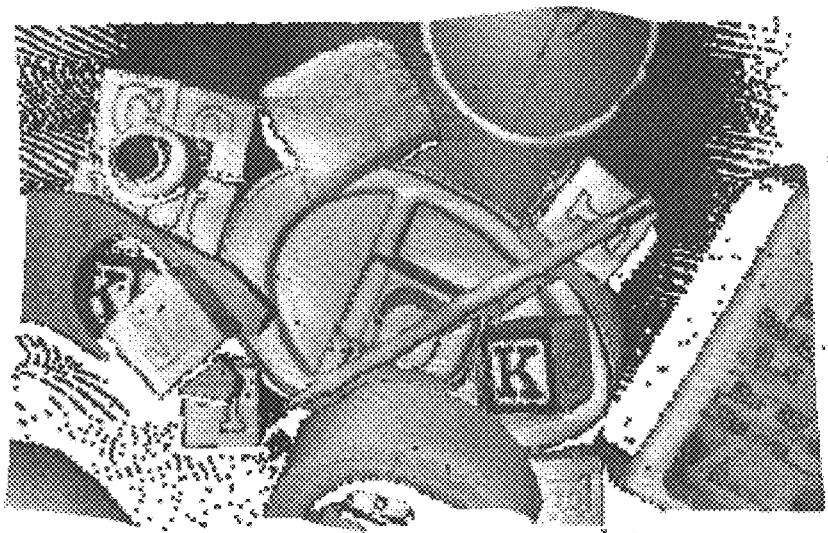
Figure 11C:
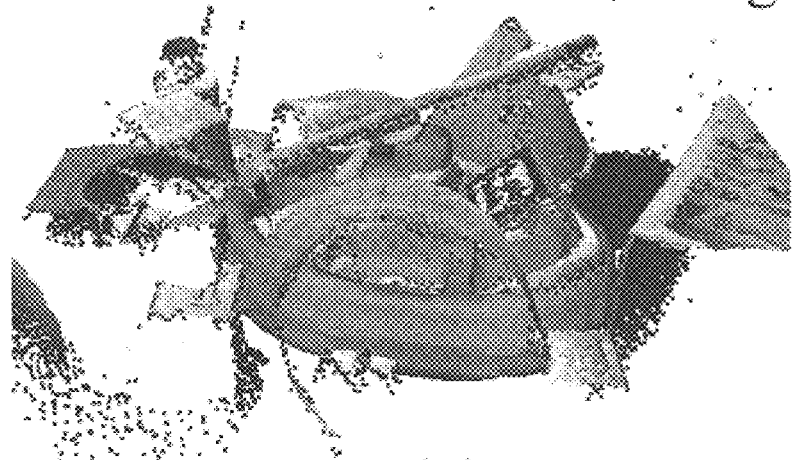

Experimentation h as shown that both k and c increase approximately linearly with h over a practical range of values, as is illustrated in FIGS. 5 and 6. As the verification phase is the most costly phase of recognition, thee variation of c has a largest practical effect on computational expense. Substituting h for c and k in the above expressions results in an approximation of the computational complexity for all phases:

$$O(s+Sh^2 \log_b n+shm) \quad (5)$$

It should be noted that, while the online recognition is time efficient, off-line pre-processing can be expensive in both time and space. Both the tree generation process and the memory required to store a tree once determined are significant. It is the expense of the pre-processing that will place a practical upper bound on the size of a template set.

Alternatively, the verification phase, which in the above noted method comprises brute-force template matching, is performed using another template matching method. For example multi-stage or hierarchical methods such as those described by Avraham Margalit and Azriel Rosenfeld in "Using probabilistic domain knowledge to reduce the expected computational cost of template matching" (Computer Vision, Graphics, and Image Processing, 51:219–233, 1990) and by Azriel Rosenfeld and Gordon J. Vanderbrug in "Coarse-fine template matching" (IEEE Transactions on Systems, Man, and Cybernetics, SMC-7:104–107, February 1977) may be used.

Alternatively, since the traversal itself executes a form of coarse template matching, verification efficiency is improved by storing partial similarity measures for the visited path nodes.

In an embodiment of the invention, providing at least two verification stages enhances system reliability. Each verification stage performs an enhanced verification to narrow potential solutions or, alternatively, each verification stage acts as a filter to remove certain types of incorrect solutions. For example, a second verification phase obtains a more accurate similarity measure at a sub-voxel resolution. The results of this verification are provided to an ICPA for pose refinement.

Alternatively, a method according to the invention is used to efficiently track a moving object in a sequence of images. Once the object's pose has been determined in the initial image, rather than starting the traversal from the tree root node, traversal begun at the node of the sub-tree common to all neighbouring classes.

Alternatively, verification of objects recognised through tree traversal is performed when a leaf node is encountered or alternatively, when object information is stored and back tracking occurs. Since an ordered list of possibly recognised objects results from application of an embodiment of the invention, this method provides ordering information in the form of results of the verification for compilation into a list when recognition is complete. Because verification is dependent upon tree traversal only for providing poses for verification, the two processes can execute concurrently—verification being performed on poses previously provided.

The method is also applicable to some 2D recognition problems, in particular those where the object scale is well controlled, such as OCR.

Though the method is disclosed for recognising a single object, any number of objects and poses may be incorporated within a tree data structure for use according to this invention.

Numerous other embodiments may be envisioned without departing from the spirit or scope of the invention.

What is claimed is:

1. A method of recognising objects within an image comprising the steps of:

a) providing contents of a plurality of elements within the image;

b) providing a data structure comprising a plurality of nodes, a node associated with a relative location of an element from the plurality of elements wherein some nodes are associated with at least an object pose;

c) selecting a first element from the plurality of elements, the first element having a predetermined characteristic and a first location;

d) selecting a current node from the plurality of nodes;

e) in dependence upon the data structure and a characteristic other than an extracted feature of contents of an element at an element location associated with the current node and the first element location, selecting another node as the current node;

f) if a current node has a predetermined node type, repeating steps (e) and (f); and, g) storing information relating to a plurality of object poses associated with at least the current node, some of the plurality of object poses relating to incorrectly recognised object poses.

2. The method of recognising objects within an image as defined in claim 1 wherein the nodes of the data structure comprise at least one of a parent node and descendant node, wherein a parent node is associated with a descendant node and a node without descendant nodes is a leaf node, wherein nodes of the data structure are associated with relative element locations, and an association between a parent node and a descendent node of the data structure is based on a characteristic of at least an element associated with the parent node.

3. A method of recognising objects within an image as defined in claim 2 wherein the step of (e) in dependence upon a characteristic of an element at the element location associated with the current node and the data structure, selecting another node as the current node comprises selecting a descendant node of the current node in dependence upon a characteristic of an element at the element location associated with the current node.

4. A method of recognising objects within an image as defined in claim 2 wherein the step of (e) in dependence upon a characteristic of an element at the element location associated with the current node and the data structure, selecting another node as the current node comprises when the current node is a leaf node, selecting a previously unselected descendant node to a previously selected node and when the current node is other than a leaf node, selecting a descendant node of the current node in dependence upon a characteristic of an element at the element location associated with the current node.

5. A method of recognising objects within an image as defined in claim 1 wherein the selection of current nodes is substantially according to a best first search algorithm.

6. A method of recognising objects within an image as defined in claim 1 comprising the step (h) verifying some of the object poses related to the stored information in dependence upon the first location.

7. A method of recognising objects within an image as defined in claim 6 wherein the step (h) is performed using at least one of a plurality of verification stages and template matching.

8. A method of recognising objects within an image as defined in claim 6 wherein the stored information comprises at least one of an object type associated with a node, an object location associated with a node and an object orientation associated with a node; and wherein the step of verifying some of the object poses comprises the step of determining if elements within a second image of an object having a substantially same object pose are substantially similar to elements within the image.

9. A method of recognising objects within an image as defined in claim 6 wherein the step of (h) verifying some of the object poses related to the stored information in dependence upon the first location is performed upon storing the information relating to at least an object pose.

10. A method of recognising objects within an image as defined in claim 1 wherein the image is a range image and the elements are voxels and the predetermined characteristic is the presence of a surface location within a voxel.

11. A method of recognising objects within an image as defined in claim 10 wherein the characteristic comprises one of:

surface: wherein a surface within the image intersects a voxel;

free: wherein the voxel lies between a sensor and a surface-valued voxel;

occluded: wherein the voxel lies beyond a surface-valued voxel from the sensor head; and, unknown: wherein the voxel lies outside of the image.

12. A method of recognising objects within an image as defined in claim 1 wherein upon storing information, a previously unselected node related to a previously selected node is selected as the current node.

13. A method of recognising objects within an image as defined in claim 1 wherein the leaf nodes are associated with a plurality of relative object poses and wherein the predetermined node type is a node other than a leaf node.

14. A method of recognising objects within an image comprising the steps of:

a) providing contents of a plurality of cells within the image, the contents having a characteristic comprising one of surface wherein a surface within the image intersects the cell, free wherein the cell lies between a sensor and a surface-valued cell, occluded wherein the cell lies beyond a surface-valued cell from the sensor head, and unknown wherein the cell lies outside of the image;

b) providing a data structure comprising a plurality of nodes, a node comprising at least one of a parent node and descendant node, wherein a parent node is associated with a descendant node and a node without descendant nodes is a leaf node, wherein nodes of the data structure are associated with relative cell locations, wherein associations between nodes of the data structure are based on a characteristic of at least the cell associated with the parent node, and wherein leaf nodes are associated with at least one of object pose, object type, and object location;

c) selecting a first cell from the plurality of cells, the first cell having a predetermined characteristic;

d) selecting a current node from the plurality of nodes;

e) when the current node is a leaf node selecting a previously unselected descendant node of a previously selected node and when the current node is other than a leaf node, in dependence upon a characteristic of a cell at the cell location associated with the current node and the data structure, selecting a descendant node associated with the current node and based on the characteristic of the current node, as the current node;

f) in dependence upon the characteristic of the cell associated with the current node, determining a likelihood that the first cell is part of an image of an object to be recognised;

g) if the node has a predetermined node characteristic, storing information relating to the object, the information comprising at least one of an object type associated with the current node, an object location associated with the current node and an object orientation associated with the current node;

h) when less than a predetermined amount of information is stored and when the determined likelihood is above a threshold likelihood, repeating steps (e) to (h); and, i) verifying some of the objects to be recognised in dependence upon the stored information.

15. A method of recognising objects within an image as defined in claim 14 wherein the step (i) is performed using template matching.

16. A method of recognising objects within an image as defined in claim 14 wherein the step (i) is performed using a plurality of verification stages.

17. A method of recognising objects within an image as defined in claim 14 wherein the data structure is an unbalanced binary tree data structure.

18. A method of recognising objects comprising the steps of:
   a) providing an image;
   b) selecting a first point within the image, the point having a characteristic, and adding the point to a first set;
   c) if fewer than a first number of object poses is consistent with characteristics and locations of points in the first set, performing one of adding the object poses to a second set and verifying some of the number of object poses consistent with characteristics and locations of points in the first set;
   d) if at least a first number of object poses is consistent with characteristics and locations of points in the first set, determining a location of a next point based on contents of the first set and the object poses consistent with characteristics and locations of points in the first set;
   e) adding the determined next point to the first set; and,
   f) until one of the first point forms part of an object pose and the first point forms part of no object pose is determined repeating steps (c) to (f).

19. A method of recognising objects within an image as defined in claim 18 comprising the step (g) verifying some of the object poses in the second set with the points in the image.

20. A method of recognising objects within an image as defined in claim 19 wherein the step (g) is performed using at least one of template matching and a plurality of verification stages.

* * * * *